United States Patent
Claywell et al.

(10) Patent No.: US 10,443,487 B2
(45) Date of Patent: Oct. 15, 2019

(54) NON-CIRCULAR GEARS FOR ROTARY WASTEGATE ACTUATOR

(71) Applicant: GM Global Technology Operations LLC, Detroit, MI (US)

(72) Inventors: Mark R. Claywell, Birmingham, MI (US); Dale A. Frank, Grand Blanc, MI (US); Maqsood Rizwan Ali Khan, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 131 days.

(21) Appl. No.: 15/493,104

(22) Filed: Apr. 20, 2017

(65) Prior Publication Data
US 2018/0306103 A1    Oct. 25, 2018

(51) Int. Cl.
| F02B 37/18 | (2006.01) |
| F01D 17/10 | (2006.01) |
| F16K 31/04 | (2006.01) |
| H02K 7/116 | (2006.01) |

(52) U.S. Cl.
CPC .......... *F02B 37/186* (2013.01); *F01D 17/105* (2013.01); *F16K 31/04* (2013.01); *H02K 7/116* (2013.01); *F05D 2220/40* (2013.01); *Y02T 10/144* (2013.01)

(58) Field of Classification Search
CPC ....... F02B 37/18; F02B 37/183; F02B 37/186
See application file for complete search history.

(56) References Cited

U.S. PATENT DOCUMENTS

| 4,327,894 | A | * | 5/1982 | Ewing | F16K 1/221 |
| | | | | | 251/129.11 |
| 4,424,781 | A | * | 1/1984 | Speer | F02D 11/04 |
| | | | | | 123/342 |
| 4,638,977 | A | * | 1/1987 | Vonhausen | B60H 1/00857 |
| | | | | | 251/248 |
| 6,974,119 | B2 | * | 12/2005 | Brendle | F02D 11/10 |
| | | | | | 123/399 |
| 7,775,197 | B2 | * | 8/2010 | Hannewald | F02M 26/58 |
| | | | | | 123/568.24 |
| 2012/0001104 | A1 | * | 1/2012 | Shimada | F16K 31/047 |
| | | | | | 251/65 |
| 2012/0255379 | A1 | * | 10/2012 | Lim | F02B 37/186 |
| | | | | | 74/42 |

(Continued)

FOREIGN PATENT DOCUMENTS

WO    WO 2012110163 A1 *   8/2012   ........... F01D 17/105

OTHER PUBLICATIONS

WO 2012110163 A1 English Translation (Aug. 2012).*

*Primary Examiner* — Jason D Shanske
*Assistant Examiner* — Jessica L Kebea
(74) *Attorney, Agent, or Firm* — Harness, Dickey & Pierce, P.L.C.

(57) ABSTRACT

A vehicle powertrain includes an engine having an air intake system and an exhaust system. A turbocharger includes a turbine section connected to the exhaust system and a compressor section connected to the air intake system. A wastegate is disposed in the exhaust system and movable between an open and a closed position by an actuator system. The actuator system includes a gear mechanism for moving the waste gate from a closed to an open position and including a pair of noncircular gears.

4 Claims, 5 Drawing Sheets

(56) References Cited

U.S. PATENT DOCUMENTS

2014/0346380 A1* 11/2014 Bourqui ................ F16K 31/041
 251/129.11
2015/0300245 A1* 10/2015 Korenaga ............... F02B 37/18
 60/603
2018/0187791 A1* 7/2018 Yamanaka ................ F16H 1/06
2018/0340705 A1* 11/2018 Bottger .................. H02K 7/116

* cited by examiner

NON-CIRCULAR GEARS FOR ROTARY WASTEGATE ACTUATOR

FIELD

The present disclosure relates to a wastegate actuator and more particularly to a wastegate actuator having improved control resolution and torque output near closed waste gate position using non-circular gears.

BACKGROUND AND SUMMARY

This section provides background information related to the present disclosure which is not necessarily prior art.

Engine assemblies may incorporate the use of turbochargers to compress the air flowing into the engine to provide a greater amount of air to each cylinder. In order to compress the air flow into the engine, the turbocharger uses exhaust flow from the engine to spin a turbine, which in turn spins an air pump (or compressor). Many turbochargers are provided with a wastegate which acts as a valve to divert exhaust gases away from the turbine wheel in a turbocharged engine system in order to regulate the turbine speed. A wastegate is usually controlled by an actuator. A wastegate is normally closed and is held shut by the actuator. When a preset pressure limit is exceeded, the actuator progressively opens the wastegate allowing exhaust flow to bypass the turbine, thus regulating manifold boost pressure. A turbocharger wastegate actuator is selected or engineered for specified boost level and turbine inlet pressure. Precise control of boost near the closed wastegate positions is an ongoing challenge often addressed through wastegate design rather than the actuator design.

Accordingly, it is desirable in the art to provide an improved wastegate actuator to accurately control the resolution and torque output of the wastegate at a near closed position.

A vehicle powertrain includes an engine having an air intake system and an exhaust system. A turbocharger includes a turbine section connected to the exhaust system and a compressor section connected to the air intake system. A wastegate is disposed in the exhaust system and movable between an open and a closed position by an actuator system. The actuator system includes a gear mechanism for moving the wastegate from a closed to an open position and including a pair of noncircular gears.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
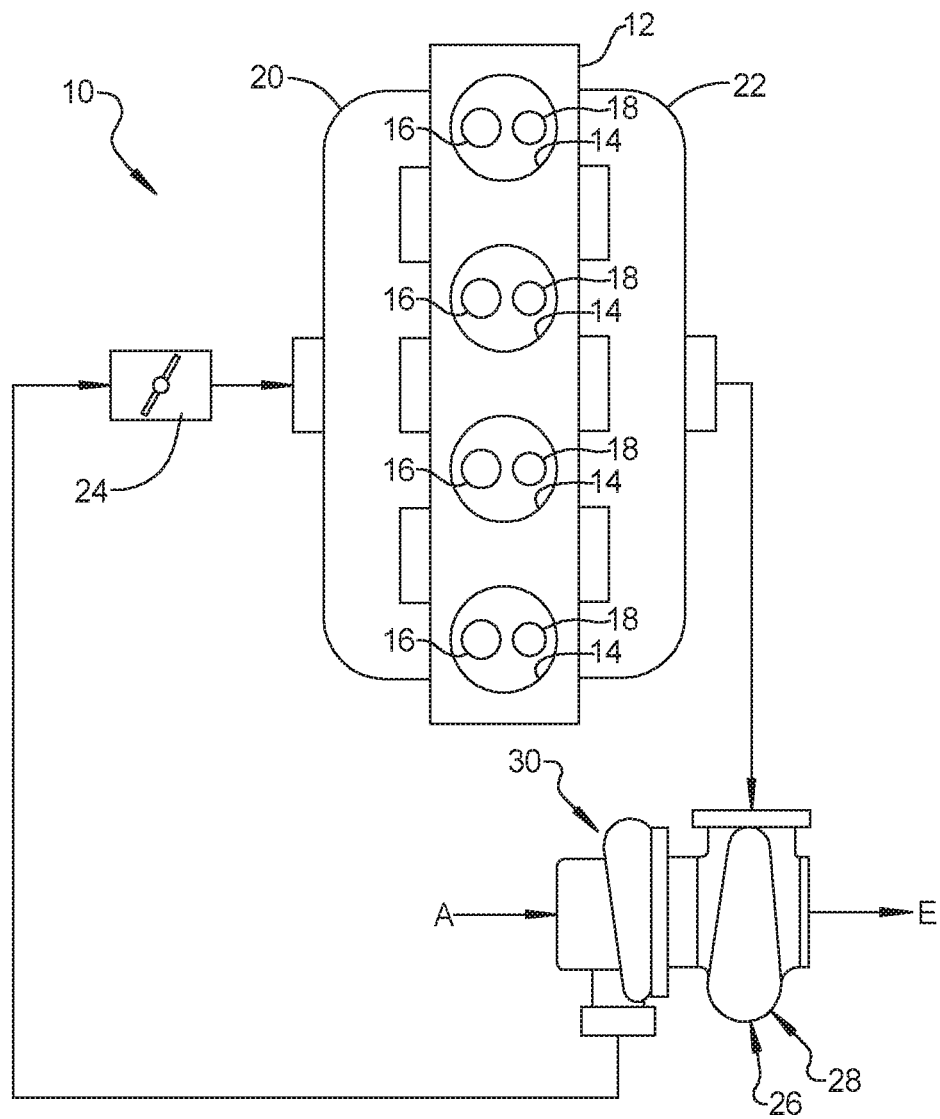
FIG. 1 is a schematic illustration of an engine assembly according to the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An engine assembly 10 is illustrated in FIG. 1 and may include an engine structure 12 defining cylinders 14 and intake and exhaust ports 16, 18 in communication with the cylinders 14, an intake manifold 20, exhaust manifold 22, a throttle valve 24 and a turbocharger 26. The engine assembly 10 is illustrated as an inline four cylinder arrangement for simplicity. However, it is understood that the present teachings apply to any number of piston-cylinder arrangements and a variety of reciprocating engine configurations including, but not limited to, V-engines, inline engines, and horizontally opposed engines, as well as both overhead cam and cam-in-block configurations.

Figure 2:
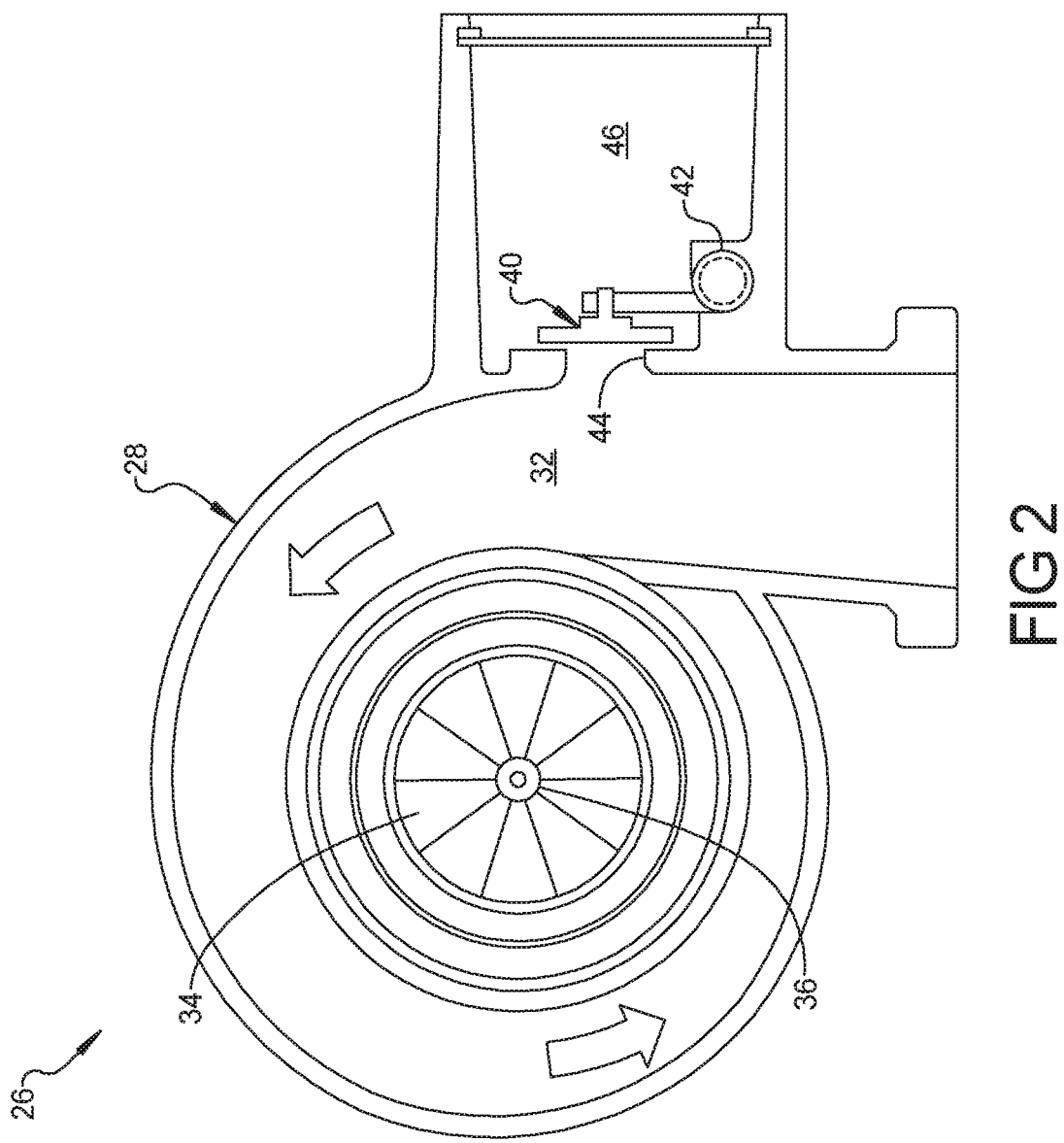
FIG. 2 is a schematic section illustration of a turbocharger having a wastegate held in a closed position according to the principles of the present disclosure.
Figure 3:
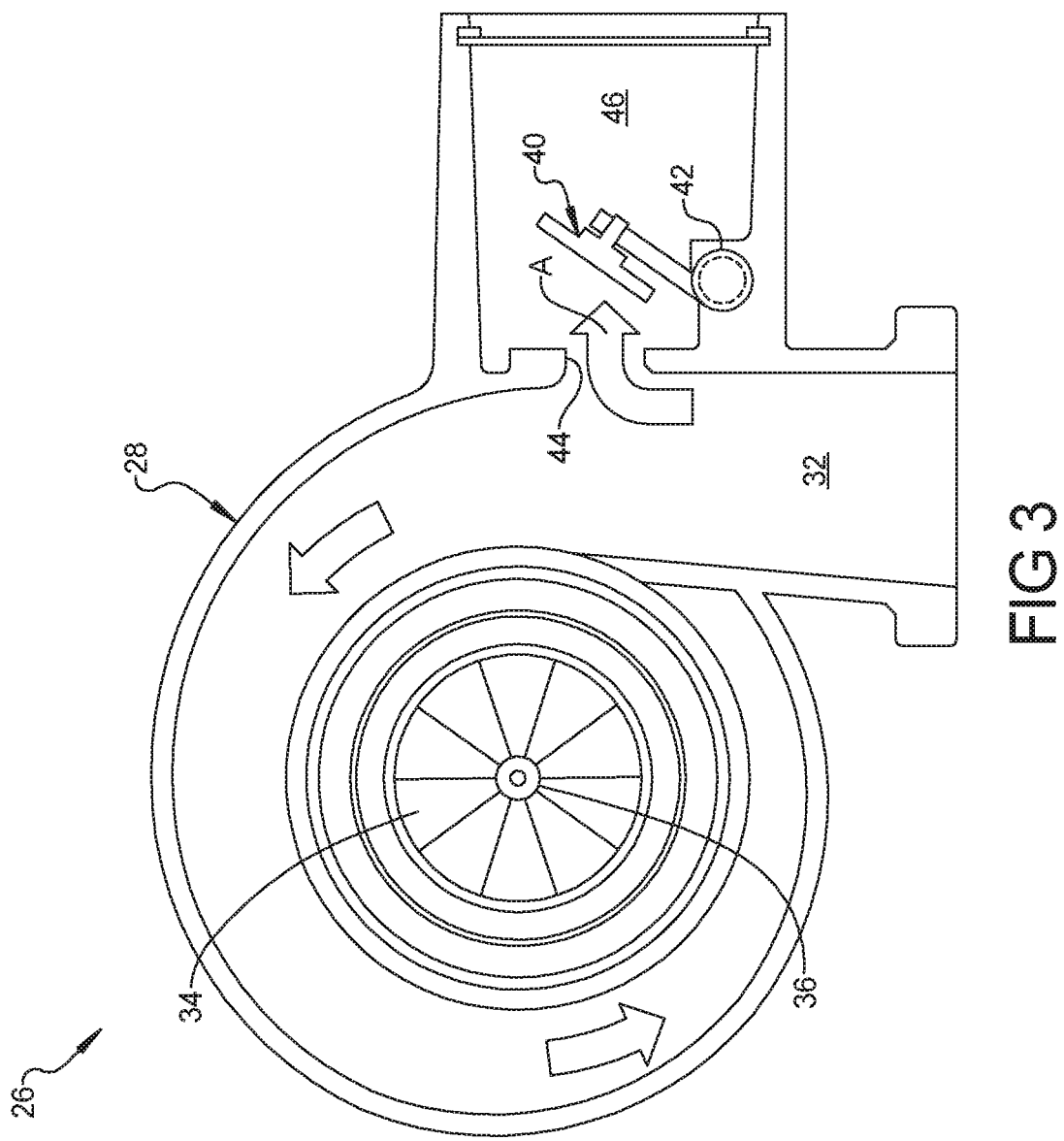
FIG. 3 is a schematic section illustration of the turbocharger of FIG. 2 having the wastegate shown in an open position according to the principles of the present disclosure.

The turbocharger 26 includes a turbine section 28 in communication with the exhaust manifold 22 and a compressor section 30 in communication with the intake manifold 20. With reference to FIG. 2, a cross-sectional view of the turbine section 28 includes a turbine passage 32 that communicates with a turbine wheel 34. As is known in the art, the turbine wheel 34 is connected to a shaft 36 that drives a compressor wheel within the compressor section 30. A wastegate 40 is pivotally mounted to the turbine section 28 by a pivot shaft 42. The wastegate 40 closes an orifice 44 in communication with an exhaust bypass passage 46. As shown in FIG. 3, the wastegate 40 is movable to an open position so that exhaust gasses can bypass the turbine wheel 34 in the direction of arrow A.

Figure 4:
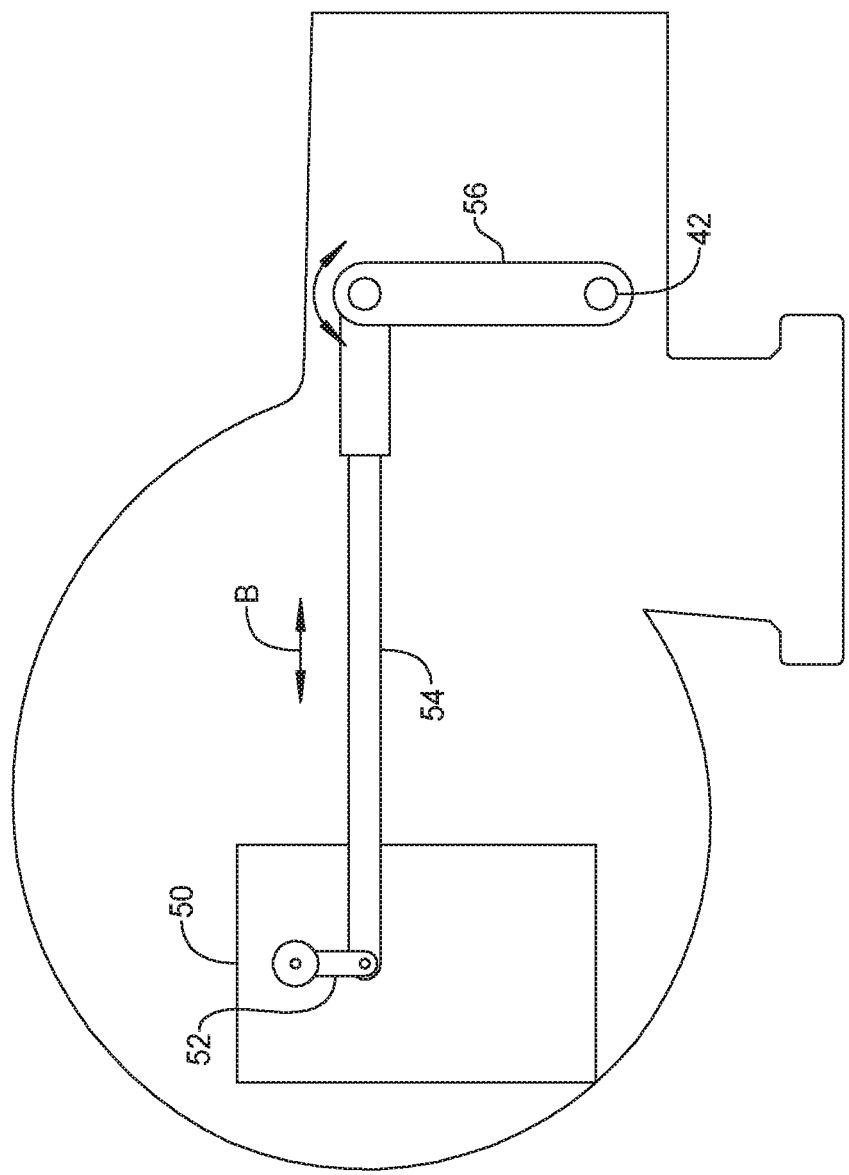
FIG. 4 is a schematic side view of a turbocharger having a wastegate actuator according to the principles of the present disclosure.
Figure 5:
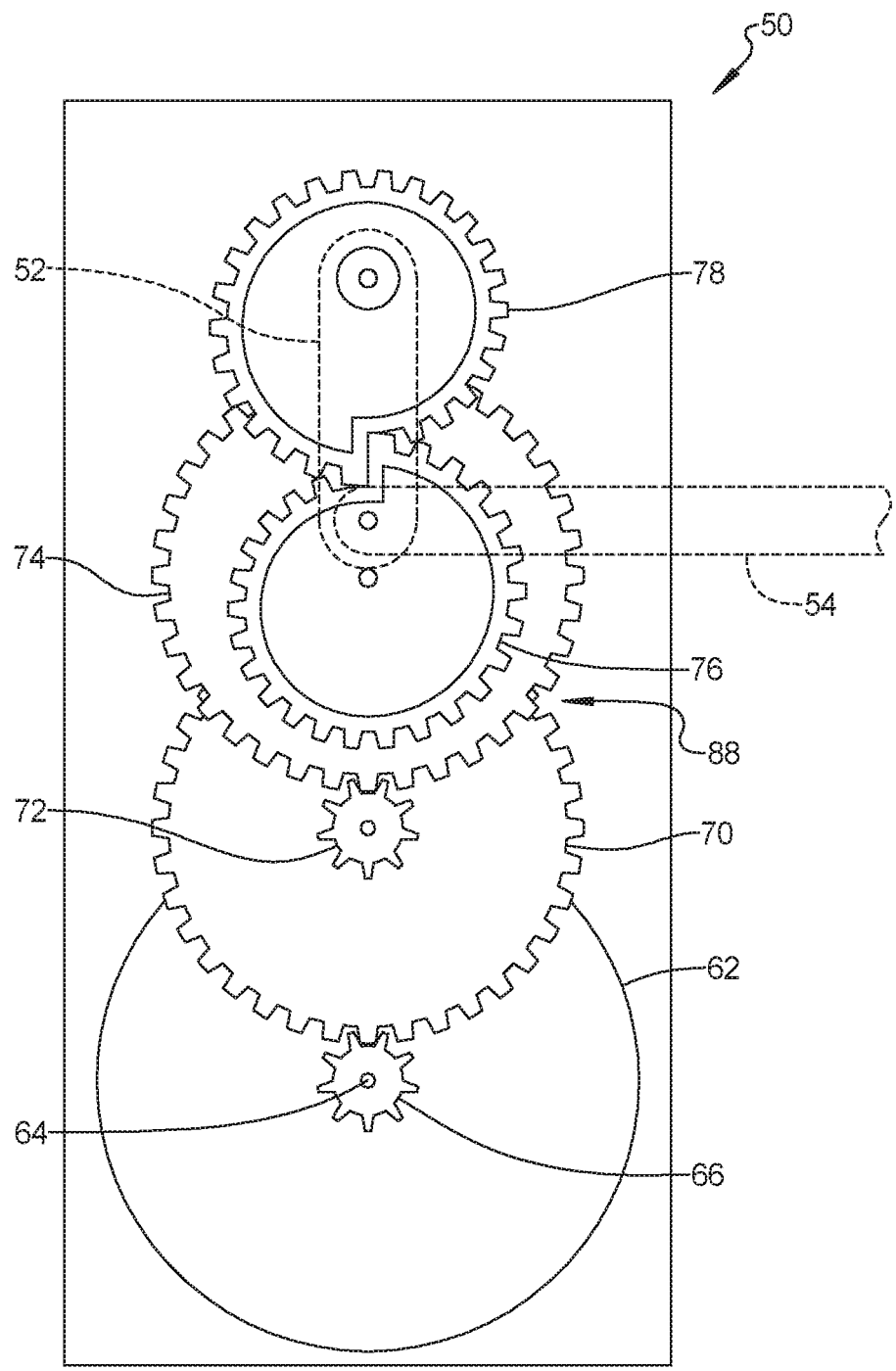
FIG. 5 is a schematic view of the wastegate actuator according to the principles of the present disclosure.

With reference to FIG. 4, an actuator 50 is shown including an arm 52 which engages a pushrod 54 and lever 56 that is fixedly attached to the pivot shaft 42. With reference to FIG. 5, the actuator 50 includes an electric motor 62 that has an output shaft 64 connected to an input gear 66. The input gear 66 engages with a reduction gear system 68 including a first reduction gear 70 that is meshed with the input gear 66 and is larger than the input gear 66 to provide a gear reduction. Optionally, the reduction gear system can further include a second smaller driven gear 72 that rotates with or is driven by the first reduction gear 70. The second smaller driven gear 72 can drive a second reduction gear 74 that is larger than the second smaller driven gear 72 to provide a second gear reduction. The reduction gear system 88 further includes a pair of non-circular gears 76, 78. A first of the non-circular gears 76 can be coaxial with and driven by the second reduction gear 74 and is in meshing engagement with the second of the non-circular gears 68. The noncircular gears 76, 78 are designed to provide accurate control of the closing of the wastegate 40.

The non-constant gear ratio of the non-circular gears 76, 78 is employed within the actuator to vary the torque response of the wastegate valve to the actuator control input. The non-constant gear ratio provides an increased gear ratio towards the closing direction of the actuator and improves the torque output and control accuracy near the wastegate closed position, while providing a faster actuation speed near the open wastegate position. The design of the present disclosure can allow the electric motor 62 to be downsized relative to a conventional electric motor as the present disclosure reduces the torque requirement. The shape of the non-circular gears can vary depending upon a desired opening and closing speed of the wastegate at various positions. The non-circular gears can have a region of constant radius portion near the closed portion of the wastegate travel in order to keep a consistent actuator force as the closed wastegate point moves over a life of the turbocharger due to wear.

In addition, the non-circular gears can be designed to linearize the wastegate flow verses the actuator travel within limits of the gear ratio change. In particular, this linear relationship can be established by setting the gear ratio according to the relationship $$d(\text{gear ratio})/d(\text{motor angle}) = \text{inverse}[d(Cd)/d(\text{actuator angle})], \quad (1)$$

where Cd is the discharge coefficient of the wastegate opening.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A turbocharger, comprising:
   a turbine section and a compressor section; and
   a wastegate disposed in the turbine section and movable between an open and a closed position by an actuator system, the actuator system including a gear mechanism for moving the wastegate from a closed to an open position and including a pair of noncircular gears having varying gear ratios and that are driven by a motor having a motor angle that drives an actuator having an actuator angle and connected to the wastegate to cause an actuation of the wastegate to move slower in a near closed position than in a near open position, wherein the pair of noncircular gears are adapted to provide a generally linear wastegate flow versus the motor angle rotational input of the actuator system according to the relationship $$d(\text{gear ratio})/d(\text{motor angle}) = \text{inverse } [d(Cd)/d(\text{actuator angle})],$$

where Cd is the discharge coefficient of the wastegate opening.

2. The turbocharger according to claim 1, wherein the gear mechanism further includes a reduction gear system.

3. The turbocharger according to claim 2, wherein the reduction gear system is driven by the motor and the reduction gear system drives the pair of noncircular gears.

4. The turbocharger according to claim 2, wherein the actuator system is connected to a drive arm that is connected to a push rod that is connected to the wastegate.

* * * * *